United States Patent Office 2,943,026
Patented June 28, 1960

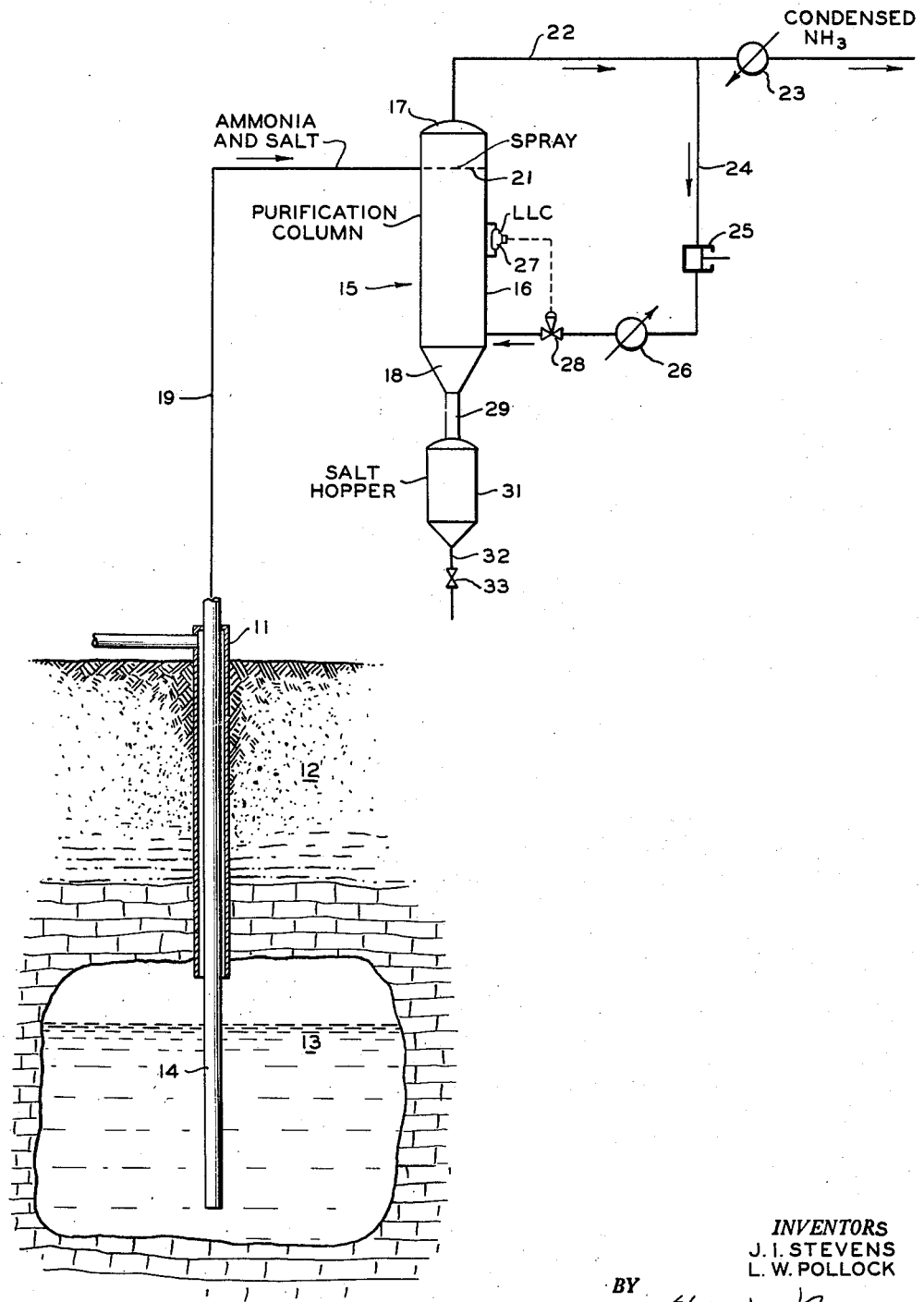

2,943,026
REMOVAL OF SALT FROM SOLUTIONS

Lyle W. Pollock and James I. Stevens, Bartlesville, Okla., assignors to Phillips Petroleum Company, a corporation of Delaware Filed Dec. 14, 1953, Ser. No. 398,084
11 Claims. (Cl. 202—64)

This invention relates to purification of solutions containing a salt. In one of its more specific aspects, it relates to a process for distilling salt solutions in which the salt has an inverse solubility. In another of its more specific aspects, it relates to a process for the removal of salt from ammonia-salt solutions.

In recent years, many difficulties have arisen with respect to obtaining adequate storage facilities for fluids. The difficulties relative to the provision of storage facilities for natural or manufactured gas for heating purposes, for liquefied petroleum gas (L.P.G.), and for items, such as ammonia, are well recognized and have resulted in the curtailment of the use of such materials because of the relative seasonal use thereof. Steel gas holders have been used for storage of each of these fluids, but their cost has rendered impractical the provision of sufficient storage space to provide adequate quantities of these fluids to enable the respective industries to "even out" their production over a year-long basis.

In more recent years, adequate storage facilities have been found by making use of caverns which are formed in salt formations of the earth. Rock salt exists beneath the surface of the earth in varying thicknesses and at various depths. The commercial recovery of salt from such salt beds has long been practiced by sinking a tube or casing down into the bed, supplying water to the bed through such a tube to dissolve a portion of the salt and pumping out the resulting brine. A cavity of considerable size and having substantially impervious walls is thus formed in the salt formation.

Cavities which have been specifically formed for the purpose of producing the salt or those which have been formed specifically for the purpose of storage of fluid materials, have been used to a great extent for the purpose of providing sufficient storage space to enable the respective industries to even off their production so as to have an adequate supply available for changing demands.

A very serious disadvantage of utilizing such a storage space is that materials which are ordinarily stored in their liquefied form, such as ammonia, liquefied petroleum gas, sulfur dioxide, hydrogen sulfide and carbon dioxide, tend to dissolve a certain amount of the salt. Thus, when portions of the fluid are removed from the storage cavern, the recovered fractions are contaminated with a corrosive and otherwise detrimental amount of salt.

The following objects will be obtained by means of the various aspects of this invention.

An object of this invention is to provide a means for purifying fluids containing salt as an undesirable constituent. Another object of the invention is to provide an improved method for removing salt from liquefied fluids. Another object of the invention is to provide means for removing salt from ammonia recovered from salt caverns used for storage. Another object of the invention is to provide an improved method for removing salt from ammonia-salt solutions. Other and further objects of this invention will be apparent to those skilled in the art upon study of the accompanying disclosure.

Broadly speaking, this invention comprises the distillation of liquefied materials containing salt, wherein the salt containing solution is sprayed into the upper portion of a purification column under such conditions as to vaporize a portion of the solution. The vaporized material is removed from the upper portion of the purification column while an unvaporized portion of the solution containing the salt is maintained in the lower portion of the purification column. A portion of the vaporized overhead is heated and returned to the lower portion of the purification column so as to supply heat to the concentrated salt solution in the lower portion of that column. Heat supplied in this manner causes crystallization of salt from the solution, the salt gravitating to the bottom of the column from which it is removed. The heat also results in further vaporization of the liquefied material which passes upwardly through the purification column countercurrent to the spray of solution. The vaporous material is removed from the upper portion of the chamber, together with that portion of the fraction which is vaporized upon spraying into the column. A portion of the overhead material is cooled so as to obtain a condensed product.

Better understanding of this invention will be obtained upon reference to the drawing which is a diagrammatic representation of the preferred system for removal of salt from a liquefied fluid-salt solution.

In the drawing, a casing 11 is set in the earth formation 12 so as to extend to the upper portion of salt cavity 13. A take-off pipe 14, smaller in diameter than casing 11, is lowered through casing 11 so as to provide an outlet conduit extending from the lower portion of salt cavern 13 to the earth surface. As is apparent, if desired, the inlet and outlet pipes can be introduced into the salt cavern through separate bore holes.

Purification column 15 comprises an upright elongated shell 16 closed at its upper and lower ends by closure members 17 and 18, respectively. Conduit 19 extends between fluid outlet conduit 14 and spray 21 in the upper portion of purification column 15. Gaseous effluent outlet conduit 22 extends from the upper end portion of column 15 and is provided with a cooler 23 therein, which cooler is utilized to cool the gaseous effluent from purification column 15 so as to condense that effluent. Conduit 24 is connected to conduit 22 upstream of cooler 23 and is connected to the lower end portion of purification column 15. Compressor 25 is provided in conduit 24 for the purpose of moving the gaseous material into the lower end portion of purification column 15. Heater 26 is provided intermediate compressor 25 and purification column 15 so as to heat the fluid which is introduced into the lower portion of the purification column. Liquid level controller 27 is connected to vertically separated points in the intermediate section of purification column 15. Valve 28 is provided in conduit 24 and may be positioned either downstream or upstream of heater 26. Better control is obtained when valve 28 is downstream of heater 26. Liquid level controller 27 is operatively connected to valve 28 by any conventional means. Salt outlet conduit 29 is provided in the lower portion of purification column 15 and is connected at its lower end to the upper end portion of salt hopper 31. Conduit 32, having valve 33 positioned therein, is connected to the lower end of salt hopper 31 for the removal of salt.

When operating according to this invention, a liquefied fluid containing salt, for the purpose of illustration, an ammonia-salt solution, is introduced into the upper portion of purification column 15 through spray 21. This salt-containing liquid may be any normally gaseous liquefied material which contains salt, though it may or may not have been recovered from a salt cavern, such as is described above.

For the purpose of illustration, it will be assumed that the liquified material is one which is stored in a salt cavern. Such materials are ordinarily stored in such caverns at a temperature in the range 15° C. to 30° C. The material is maintained under sufficient pressure in the storage cavern to keep it in a liquefied state, generally at a pressure above 105 p.s.i.a. The liquefied material is withdrawn from salt cavern 13 by conventional means such as displacement with a fluid, inert and relatively immiscible with the ammonia, or by pumping. The ammonia-salt solution is introduced into the upper portion of purification column 15 through spray 21. Obviously, the pressure of the liquefied material-salt solution must be at a pressure higher than that maintained in purification column 15. When ammonia is purified in column 15, the purification column 15 is generally maintained at a pressure within the range of from 200 to 325 p.s.i.a., although higher pressures may be used with accompanying higher temperatures. In order to vaporize a portion of the ammonia in the upper portion of column 15 under a pressure in the range of 200 to 325 p.s.i.a. it is necessary to maintain the upper portion of that column at a temperature within the range of between about 40° C. and 55° C. In order to start up the purification system, we prefer to use a portion of pure normally gaseous product which is available in liquefied form and in relatively small amounts in a surface tank at the storage area. Such material is introduced by a line, not shown, to conduit 24 where it is heated in heater 26 and introduced into the lower portion of column 15.

The solution is sprayed or flashed into the upper portion of purification column 15, and upon entering the chamber within that column, a portion of that solution is vaporized and is removed from the upper end of the column through gaseous effluent outlet conduit 22. The column is, in one modification, maintained under such conditions of pressure and temperature that a part of the liquefied fluid remains unvaporized. Unvaporized and concentrated salt solution gravitates to the lower portion of the purification column wherein a more concentrated salt solution of that liquefied fluid is maintained. A portion of the gaseous effluent which is removed through conduit 22 is passed through heat exchanger 23 wherein it is cooled so as to condense it for further handling. The balance of the gaseous effluent is passed by means of conduit 24 through some means for pressurizing that fraction, preferably through compressor 25, although some type of blower may be used.

The vaporous material is heated to a temperature above 80° C., but below the decomposition temperature of the vapor, preferably within the range of between 90° C. and 260° C. The specific temperature to which the vapors are heated will depend upon the amount of vaporous material which it is desired to introduce into the reboiler section of purification column 15. The reboiler section of column 15 is preferably maintained at a temperature 1° C. to 5° C. above that maintained in the upper portion of the column, though temperatures above this range may be used with accompanying higher pressures.

The amount of heated gaseous material which is introduced into the lower portion of purification column 15 is controlled by means of valve 28. Valve 28 is automatically controlled by means of liquid level controller 27 connected to intermediate points of purification column 15. As the concentrated solution within purification column 15 falls below a predetermined minimum, liquid level controller 27 reduces the opening through valve 28 so as to reduce the amount of heated vapor which is introduced into the reboiler section of purification column 15, thus reducing the amount of vaporization of the liquid material within that column. As the liquid level rises above a predetermined maximum, liquid level controller 27 operates to increase the size of the opening through valve 28, thus supplying a greater amount of heated vapor to the reboiler section of purification column 15 so as to increase the vaporization of the liquefied material within that column.

As heat is supplied to the concentrate solution maintained within the lower portion of purification column 15, the salt is caused to crystallize out of the solution and precipitates to the bottom of column 15 and is removed from that column through conduit 29 to salt hopper 31. The salt crystals are then removed at convenient times from the lower portion of hopper 31 through conduit 32 and valve 33. If desired, the salt can be reintroduced into the cavern, thereby saturating the liquid and thus preventing substantial enlargement of the cavern. Material which is vaporized from the concentrated solution in the bottom of column 15 passes upwardly through the column countercurrent to the gravitating droplets of unvaporized material, resulting in a partial vaporization of the unvaporized material. The vaporized material is then removed from the upper portion of purification column 15 through conduit 22.

In a second modification of this invention, column 15 is maintained under such conditions of pressure and temperature that the liquid material when sprayed into the column is vaporized either by flashing or evaporation by countercurrently flowing vaporous material corresponding to the vapors recovered from the upper portion of the column, that vaporous material having been heated to a temperature necessary to accomplish the vaporization. The temperature to which the vaporous material which is introduced into the lower portion of column 15 is heated will depend upon the pressure and temperature within that column. The pressure and temperature within column 15 will, to some extent, be dependent upon the specific type of cooling which is used in cooler 23. When the cooling is accomplished by means of cooling water, ordinarily the lowest temperature to which the vaporous material introduced into the lower portion of column 15 is one above 80° C. but below the decomposition temperature of the vapor. If refrigeration is used in cooler 23, the pressure and temperature maintained within column 15 will be materially lower than that used when cooling water is used. Under such circumstances, the vaporous material introduced into the lower portion of column 15 is generally heated to a temperature above about 25° C. Vapors and dry salt are then removed from the system as described above.

Various modifications of this invention will be apparent to those skilled in the art upon study of the accompanying disclosure and the drawing. Such modifications are believed to be within the spirit and the scope of this invention.

We claim:

1. A combination liquid recovery and salt separation system suitable for recovering normally gaseous liquefied material from a subterranean chamber situated in an underground salt formation comprising a flash chamber positioned at the surface of the earth, means for withdrawing stored liquid from said subterranean chamber, means for spraying said liquid into said flash chamber, a condenser positioned externally from said chamber, a first conduit connecting the upper portion of said flash chamber with said condenser, whereby vapors withdrawn overhead from said chamber can be condensed, a second conduit branching from said first conduit and extending into the lower portion of the flash chamber, whereby a portion of the overhead vapors can be recycled to the bottom section of the flash chamber, indirect heat exchange means associated with said second conduit to effect heating of the vapors recycled therethrough, and a closed salt receiver positioned below said flash chamber and closably connected to the base thereof.

2. In the system of claim 1, a liquid level controller connected to said flash chamber, a valve in said second conduit, and control line connecting said liquid level controller with said valve to adjust the position of the latter, whereby the vapor flow through said conduit can be regulated so as to maintain a substantially uniform liquid level within said flash chamber.

3. A method of removing salt from normally gaseous liquefied material containing salt dissolved therein which comprises flashing said material in the upper vapor phase portion of a heated purification zone, removing vaporized salt-free material from the upper portion of said zone, collecting unvaporized salt-containing liquid in the lower portion of said zone, dividing said vaporized material into a product stream and a recycle portion, heating by indirect heat exchange said recycle portion of the vaporized material and introducing it at a control rate into the liquid fraction in the lower portion of said zone, whereby a portion of the liquid is vaporized and a portion of the salt is crystallized, producing an output responsive to changes in the level of said liquid fraction beyond predetermined high and low limits, controlling said rate of introduction of vaporized material by increasing said rate in response to an output produced by high liquid level and decreasing said rate in response to an output produced by low liquid level, and recovering vaporized material and crystallized salt as separate products.

4. A method of removing salt from normally gaseous liquefied material containing salt dissolved therein which comprises spraying said salt-containing material into the upper vapor phase portion of a heated purification zone, introducing heated vapor subsequently described into said zone, contacting said material thus sprayed with a sufficient amount of said heated vapor to vaporize said material and crystallize said salt, withdrawing vapor from said distillation zone, condensing a first portion of said vapor, recovering the condensate as product, heating by indirect heat exchange a second portion of said vapor thereby forming the above-mentioned heated vapor, maintaining the temperature and pressure within said distillation zone to completely evaporate said sprayed material and recovering dry salt from the lower portion of said purification zone.

5. A method of removing salt from normally gaseous liquefied material containing salt dissolved therein which comprises spraying said material into the upper portion of an elongated vertical purification zone, introducing heated vapor subsequently described into the lower portion of said zone, removing vapor from the upper portion of said zone, allowing said material thus sprayed to gravitate toward said lower portion of said zone, thereby countercurrently contacting said sprayed material with said heated vapor, dividing said vapor removed from said zone into a product stream and a recycle portion, heating by indirect heat exchange said recycle portion of said vapor removed thereby forming the above-mentioned heated vapor, and maintaining the temperature and pressure of said zone through the introduction and removal of vapor such that said sprayed material is completely evaporated and substantially dry salt is deposited in the lower portion of said zone.

6. A method of removing salt from normally gaseous liquefied material containing inorganic salt dissolved therein which comprises spraying the salt-containing material in an upper, vapor phase portion of a heated purification zone thereby forming vapors of said material and crystallizing salt, withdrawing said vapors from said purification zone, dividing said vapors into a product stream and a recycle stream, heating said recycle stream by indirect heat exchange, passing said heated recycle stream into the lower portion of said purification zone in sufficient amount to supply the heat necessary to form said vapors in said upper portion of said zone, and withdrawing salt from the lower portion of said purification zone.

7. A method according to claim 6 wherein said material is ammonia and said recycle stream is heated to a temperature above 80° C. but below the decomposition temperature of the ammonia.

8. A method according to claim 7 wherein said recycle stream is heated to a temperature within the range of 90° C. to 260° C.

9. A method according to claim 6 wherein said material is liquified petroleum gas and said recycle stream is heated to a temperature above 80° C. but below the decomposition temperature of the petroleum gas.

10. A method according to claim 9 wherein said recycle stream is heated to a temperature within the range of 90° C. to 260° C.

11. A method of removing salt from normally gaseous liquefied material containing inorganic salt dissolved therein which comprises spraying said salt-containing material in an upper, vapor phase portion of a heated purification zone thereby forming vapors of said material and concentrating the salt in the unvaporized portion, collecting the unvaporized portion of said material in the lower portion of said zone, withdrawing said vapors from said purification zone, dividing said vapors into a product stream and a recycle stream, heating by indirect heat exchange said recycle stream, passing said heated recycle stream into said unvaporized material in the lower portion of said purification zone in sufficient amount to supply the heat necessary to form said vapors in said upper portion of said zone, and withdrawing concentrated salt-containing material from the lower portion of said purification zone.

References Cited in the file of this patent

UNITED STATES PATENTS

| 586,950 | Frerichs | July 20, 1897 |
| 870,747 | Planckh | Nov. 12, 1907 |
| 1,461,460 | Wirth-Frey | July 10, 1923 |
| 1,923,896 | Trump | Aug. 22, 1933 |
| 2,012,621 | Bennett | Aug. 27, 1935 |
| 2,014,374 | Brill | Sept. 17, 1935 |
| 2,159,899 | Kranz | May 23, 1939 |
| 2,221,518 | Jennings | Nov. 12, 1940 |
| 2,450,612 | Potts | Oct. 5, 1948 |
| 2,458,902 | Fitzhugh et al. | Jan. 11, 1949 |
| 2,590,066 | Pattinson | Mar. 18, 1952 |
| 2,640,018 | Heath | May 26, 1953 |
| 2,677,666 | Dougherty | May 4, 1954 |
| 2,713,775 | Cottle | July 26, 1957 |

OTHER REFERENCES

"Types of Underground Liquid Storage," by D. Ball, "The Petroleum Engineer, Reference Annual, 1954," pp. E21–22, E24.

"Propane Transportation and Storage . . ." by J. W. Bodd et al., "The Petroleum Engineer, Reference Annual 1954," pages D26, 28, 29, 30.